United States Patent
Smolik

Patent Number: 6,119,005
Date of Patent: Sep. 12, 2000

[54] SYSTEM FOR AUTOMATED DETERMINATION OF HANDOFF NEIGHBOR LIST FOR CELLULAR COMMUNICATION SYSTEMS

[75] Inventor: Kenneth Frank Smolik, Naperville, Ill.

[73] Assignee: Lucent Technologies Inc., Murray Hill, N.J.

[21] Appl. No.: 09/085,422

[22] Filed: May 27, 1998

[51] Int. Cl.[7] .............................. H04Q 7/20; H04Q 7/00; H04B 7/212

[52] U.S. Cl. ......................... 455/436; 370/320; 370/331; 455/423

[58] Field of Search ................................... 455/436, 423; 370/320, 331

[56] References Cited

U.S. PATENT DOCUMENTS

| | | | |
|---|---|---|---|
| 5,828,661 | 10/1998 | Weaver, Jr. et al. | 370/331 |
| 5,852,778 | 12/1998 | Labedz | 455/423 |
| 5,889,768 | 3/1999 | Storm et al. | 370/320 |
| 5,982,758 | 11/1999 | Hamdy | 370/331 |

*Primary Examiner*—William Cumming
*Attorney, Agent, or Firm*—Duft, Graziano & Forest, P.C.

[57] ABSTRACT

The system for automated determination of handoff neighbor list uses the data collected from mobile subscriber units to automatically update the handoff neighbor list. The mobile subscriber unit produces Pilot Strength Measurement (PSM) data that is indicative of the relative signal strength measured at the mobile subscriber unit from a plurality of pilot channels. The mobile subscriber unit transmits this data, along with a list of viable pilot channel candidates as determined by the mobile subscriber unit, to the base station serving the existing call. The system for automated determination of handoff neighbor list maintains a data structure that stores data indicative of the number of instances that a pilot channel is recommended, the sum of power levels that were measured by the various mobile subscriber units for these instances. This data is processed to determine a metric for each data structure in the list, with the metric in the present embodiment being a function of the number of occurrences multiplied by a weighting factor summed with the sum of power levels.

16 Claims, 3 Drawing Sheets

SYSTEM FOR AUTOMATED DETERMINATION OF HANDOFF NEIGHBOR LIST FOR CELLULAR COMMUNICATION SYSTEMS

FIELD OF THE INVENTION

This invention relates to cellular communications systems and in particular to a system that automatically determines and updates the handoff neighbor list for the base stations that are contained in the cellular communication system.

PROBLEM

It is a problem in the field of cellular communication systems to maintain an updated list of optimal cellular communication connection handoff sites. In particular, Code Division Multiple Access (CDMA) systems use mobile assisted handoffs in which the mobile subscriber unit identifies possible target base stations as handoff options when the signal quality degrades below a predetermined threshold. The serving base station processes the received suggestions and selects a handoff base station by comparing the suggestions with a predetermined neighbor list that is maintained in the base station base station. The neighbor list is typically manually created by a craftsperson and updated for each sector in every base station. Since a CDMA system may consist of several hundred base stations, the task of maintaining neighbor lists is daunting. However, the following description is also applicable to other types of digital systems, such as Time Division Multiple Access (TDMA), which support mobile assisted handoffs.

The neighbor list is limited in the number of handoff candidates that can be listed and the list must represent a dynamically changing perspective of the cellular communication environment. In particular, the radio frequency environment changes as a function of season with foliage growth, and also changes dynamically with the volume of call traffic (on a per hourly basis) in the various cells and the relative location of a mobile unit with respect to intervening structures, such as high rise office buildings. Thus, updates to the neighbor list must occur on a regular basis and must represent an accurate characterization of the cellular communication environment. Typically, this process initially includes the determination of line-of-sight radio paths from the base station to various locations in the cell service area using a map and subsequently refined by driving tests, which involve a mobile subscriber unit traversing a predetermined route. Such updates are expensive to implement since they are manually intensive and the updates are therefore done infrequently. With the rapid increase in the number of base stations and cellular communication traffic, the problem of maintaining a current neighbor list represents a significant traffic effecting situation.

There is presently no simple and effective manner of updating the neighbor lists in cellular communication systems. Therefore, the accuracy of the neighbor lists is typically addressed only when the cellular communication service that is provided drops below an acceptable threshold.

SOLUTION

The above described problems are solved and a technical advance achieved by the present system for automated determination of handoff neighbor lists for cellular communication systems that is operational in the base station and that uses the data collected from mobile subscriber units to automatically update the handoff neighbor list. Thus, the neighbor list update process is dynamic and driven by the changing circumstances in the cellular environment, rather than statically driven by an infrequent manual neighbor list update process.

The mobile subscriber unit continuously produces Pilot Strength Measurement (PSM) data that is indicative of the relative signal strength from a plurality of pilot channels as measured at the mobile subscriber unit. The mobile subscriber unit transmits this signal strength data, along with a list of viable pilot channel candidates as determined by the mobile subscriber unit, to the base station serving the existing call connection. The system for automated determination of handoff neighbor list maintains a data structure at the base station that stores data indicative of the number of instances that a pilot channel is recommended and the sum of power levels that were measured by the various mobile subscriber units for these instances. This data is processed to determine a metric for each data structure in the list, with the metric in the present embodiment being a function of the number of occurrences multiplied by a weighting factor, with this result being summed with the sum of power levels. If soft handoffs are permitted, an additional computation can be used to adjust the relative frequency of call origination failures to existing call drops. Thus, the neighbor list maintained by the system can be dynamically tuned to emphasize either call setups or maintenance of existing calls.

In this manner, the neighbor list is automatically updated on a continuing basis by using the signal strength data that is measured by the various mobile subscriber units that are operational in the call coverage area of the base station. This continuous data collection process enables the neighbor list to reflect the present radio frequency environment without the need for manual intervention, thereby improving the cellular communications service that is provided without incurring a significant additional cost of operation.

DETAILED DESCRIPTION

Figure 1:
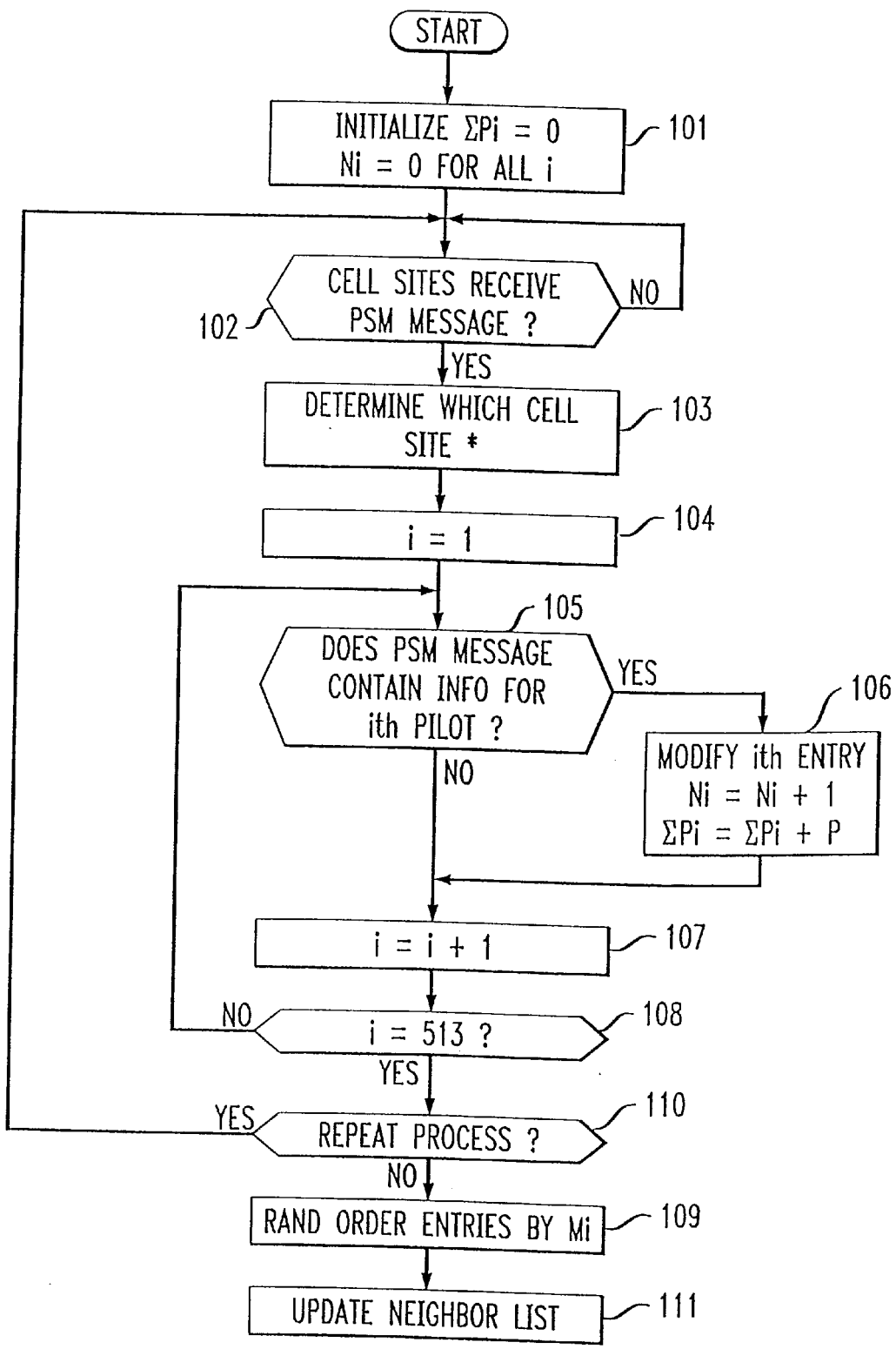
FIG. 1 illustrates in flow diagram form the operational steps taken by the present system for automated determination of handoff neighbor lists for cellular communication systems to perform the neighbor list update process.

Cellular mobile telecommunication systems provide the service of connecting mobile telecommunication customers, each having a mobile subscriber unit, to both land-based customers who are served by the common carrier public telephone network as well as other mobile telecommunication customers. In such a system, all incoming and outgoing calls are routed through the mobile switching center (MSC), each of which is connected to a plurality of base stations which communicate with mobile subscriber units located in the area covered by the base stations. The mobile subscriber units are served by the base stations, each of which is located in one cell area of a larger service region. Each base station in the service region is connected by a group of communication links to the mobile switching center, with the communication link being either direct or indirect through a controller that may span a plurality of base stations. Each base station contains a group of radio transmitters and receivers with each transmitter-receiver pair being connected to one communication link. Each transmitter-receiver pair operates on a pair of radio frequencies: one frequency to transmit radio signals to the mobile subscriber unit and the other frequency to receive radio signals from the mobile subscriber unit. With CDMA systems, a plurality of transmitter-receiver pairs share a common frequency pair. This is possible with the orthogonal coding that is inherent in CDMA. The first stage of a cellular communication connection is set up when a transmitter-receiver pair in a base station, operating on a predetermined pair of radio frequencies, is turned on and a mobile subscriber unit, located in the base station, is tuned to the same pair of radio frequencies. The second stage of the communication connection is between the communication link connected to this transmitter-receiver pair and another communications network, such as a common carrier public telephones network. This second stage of the communication connection is set up in the mobile switching center, which is connected to the common carrier public telephone network by incoming and outgoing trunks. The mobile switching center contains a switching network to switch mobile customer voice and/or data signals from the communication link to an incoming or outgoing trunk. The mobile telecommunication system is controlled by a mobile telecommunication controller at the mobile switching center and a base station controller at or remotely connected to each base station associated with the mobile switching center. A plurality of data links connect the mobile telecommunication controller and the associated base station controllers. The mobile telecommunication controller operates under control of complex software and controls the switching network. The mobile telecommunication controller also controls the actions of the associated base station controllers by generating and interpreting the control messages that are exchanged with the associated base station controllers over the data links. The base station controllers at each base station, in response to control messages from the mobile telecommunication controller, control the transmitter-receiver pairs at the base station. The control processes at each base station also control the tuning of the mobile subscriber units to the selected radio frequencies.

Each cell in the ground-based cellular mobile telecommunication network comprises a predetermined volume of space radially arranged around the base station transmitting antenna with the region of space roughly approximating a cylindrical volume having limited height. Since, all of the mobile subscriber units are installed in ground-based units (such as motor vehicles) in traditional cellular mobile telecommunication systems, the antenna radiation pattern of the base station is aligned to be proximate to the ground and the polarization of the signals produced by the base station antenna is vertical in nature. In order to prevent the radio signals in one base station from interfering with radio signals in an adjacent base station, the transmitter frequencies and orthogonal coding for adjacent base stations are selected to be different so that there is sufficient signal separation between adjacent transmitter frequencies to avoid overlapping transmissions among adjacent base stations. When a ground-based mobile subscriber unit initiates a call connection, control signals from the local base station transmitter cause the frequency agile transponder in the ground-based mobile subscriber unit to operate at the frequency of operation and orthogonal coding designated for that particular base station. As the ground-based mobile subscriber unit moves from one base station to another, the call connection is handed off to the successive base stations and the frequency agile transponder in the ground-based mobile subscriber unit adjusts its frequency of operation and orthogonal coding to correspond to the frequency of operation and orthogonal coding of the transmitter located in the base station in which the ground-based mobile subscriber unit is presently operational.

Base Stations

Mobile cellular telecommunication systems provide a plurality of concurrently active communications in the same service area, with the number of concurrently active communication connections exceeding the number of available radio channels. This is accomplished by reusing the channels via the provision of multiple base stations in the service area that is served by a single mobile switching center. The overall service area of a mobile switching center is divided into a plurality of "cells", each of which includes a base station and associated radio transmission tower. The radius of the cell is basically the distance from the base station tower to the furthest locus at which good reception between the mobile subscriber unit and the base station can be effected. The entire service area of a mobile switching center is therefore covered by a plurality of adjacent cells. There is an industry standard cell pattern in which sets of channels are reused. Within a particular cell, the surrounding cells are grouped in a circle around the first cell and the channels used in these surrounding cells differ from the channels used in the particular cell and from each of the other surrounding cells. Thus, the signals emanating from the radio transmission tower in the particular cell do not interfere with the signals emanating from the radio transmission towers located in each of the surrounding cells because they are at different frequencies and have different orthogonal coding. In addition, the next closest cell using the transmission frequency of the particular cell is far enough away from this cell that there is a significant disparity in signal power and therefore sufficient signal rejection at the receivers to ensure that there is no signal interference. The shape of the cell is determined by the surrounding terrain and is typically not circular, but skewed by irregularities in the terrain, the effect of buildings and vegetation and other signal attenuators present in the cell area. Thus, the cell pattern is simply conceptual in nature and does not reflect the actual physical extent on the various cells, since the implemented cells are not hexagonal in configuration and do not have precisely delimited boundary edges.

The control channels that are available in this system are used to setup the communication connections between the mobile subscriber units and the base station. When a call is initiated, the control channel is used to communicate between the mobile subscriber unit involved in the call and the local serving base station. The control messages locate and identify the mobile subscriber unit, determine the dialed number, and identify an available voice/data communication channel consisting of a pair of radio frequencies and orthogonal coding which is selected by the base station for the communication connection. The radio unit in the mobile subscriber unit retunes the transmitter-receiver equipment contained therein to use these designated radio frequencies and orthogonal coding. Once the communication connection is established, the control messages are typically transmitted to adjust transmitter power and/or to change the transmission channel when required to handoff this mobile subscriber unit to an adjacent cell, when the subscriber moves from the present cell to one of the adjoining cells. The transmitter power of the mobile subscriber unit is regulated since the magnitude of the signal received at the base station is a function of the mobile subscriber unit transmitter power and the distance from the base station. Therefore, by scaling the transmitter power to correspond to the distance from the base station, the received signal magnitude can be maintained within a predetermined range of values to ensure accurate signal reception without interfering with other transmissions in the cell. When a mobile subscriber unit approaches the boundary of a cell, the radio signal received at the base station is at a minimum level. Since the mobile subscriber unit is at the boundary of two cells, the signal power from the transmitter located in the adjacent cell is equal to or greater than the original cell and a handoff procedure is initiated. First, the cell base station may initiate a mobile subscriber unit location process in the adjoining cells. Alternatively, the serving base station may utilize measurements from the mobile subscriber unit by processing the received pilot strength measurement message as discussed below in reference to mobile assisted handoffs. This first procedure is accomplished either by activation or continuous operation of a locating receiver in each of the adjoining cells which tunes to the radio frequency and channel on which the mobile subscriber unit is transmitting. The measured signal strength of this signal, as received at each of the adjoining cells, is compared and the strongest signal is indicative at that base station which is to receive the handoff. If there is an available voice channel in that cell, the mobile subscriber unit is sent a message on the control channel to re-tune its transmitter to the identified available voice channel at the transmitter frequency and orthogonal coding of the selected cell. Simultaneously, the voice connection is switched at the base stations from one cell to the next via the Mobile Switching Center to provide uninterrupted service.

Pilot Channels

In CDMA-based cellular communications systems, the pilot channel is a reference channel that is used by the mobile subscriber unit to acquire the timing of the Forward CDMA Channel and also provides a phase reference for coherent demodulation. The pilot channel can also be used to perform signal strength measurements to compare the relative signal strength from several base stations in the determination of whether a handoff is appropriate. The pilot channel is identified by a pilot sequence offset and a frequency assignment. The base station of the cell continuously transmits the pilot channel for every CDMA channel that is supported by the base station. Each mobile subscriber unit that is active withing the call coverage area of the cell continuously monitors the pilot channels and measures their signal strengths. For each mobile subscriber unit, the base station maintains a list of the Active Set and Neighbor Set members associated with that particular mobile subscriber unit. Upon call initiation, the mobile subscriber unit initializes the Active Set to contain the pilot channel that is associated with the forward traffic channel assigned to the presently active cellular communication connection and the Neighbor Set to contain all of the pilot channels that are specified in the Neighbor List Message that was last received by the mobile subscriber unit from the base station.

There are typically 512 pilot channels in a base station and these pilot channels are divided into a number of sets for administration purposes. These sets are:

Active Set is the set of all pilot channels that are associated with forward traffic channels that are assigned to this mobile subscriber unit.

Candidate Set is the set of all pilot channels that are not in the Active Set but received by the mobile subscriber unit with sufficient signal strength to indicate that it could support the forward traffic channel.

Neighbor Set is the set of pilot channels that are likely candidates for handoffs but are not members of the Active Set or the Candidate Set.

Remaining Set is the set of all pilot channels in the cellular system on the present CDMA frequency that are not in the Active Set or the Candidate Set or the Neighbor Set.

The typical cellular communication system contains 512 pilot channels and a mobile subscriber unit can have up to 6 pilot channels concurrently active. When the mobile subscriber unit is activated to initiate or receive a call, the base station assigns an active set of pilot channels and a neighbor set of pilot channels to the selected mobile subscriber unit. The mobile subscriber unit then creates a candidate set of pilot channels as part of its ongoing operation.

MOBILE ASSISTED HANDOFFS

Existing CDMA systems use mobile assisted handoffs in which the mobile subscriber units report possible target base stations (or base station sectors) and associated pilot channels that are candidates for a handoff. The base station that is serving the existing cellular call connection processes the target base station data and matches it with the existing neighbor list for this mobile subscriber unit. If the mobile subscriber unit identifies a candidate pilot channel that is not on the neighbor list, the candidate pilot channel is rejected by the serving base station. However, the neighbor list is typically manually created and updated for each sector in every base station. Since a CDMA system may consist of several hundred base stations, the task of maintaining neighbor lists is daunting. Furthermore, the cells can shrink in size as the traffic increases. This is because there is a limited power budget for cellular communications and the traffic load causes this power budget to effectively shrink the call coverage area, as the signal power is used and the range of the pilot channels decreases.

While the use of the above-noted Active, Neighbor, Candidate and Remaining sets to manage call connections and handoffs is an effective process, it suffers from the limitation that the Neighbor list is infrequently updated and at great expense. As cellular communications increase in volume, the use of substantially fixed Neighbor Sets results in an increased number of service problems, such as dropped calls or failed call originations, since the variations in cell size and changes in the radio communication characteristics in the serving area are not addressed in a timely manner.

Neighbor List Update Algorithm

The present system for automated determination of handoff neighbor lists for cellular communication systems (termed the "automated neighbor list update system" herein) is located in the base station and functions to manage the creation and maintenance of the Neighbor List for the mobile subscriber units that are operational within the call coverage area of the cell. In the automated neighbor list update system, mobile assisted handoff information is collected at the base station either on a continuous basis or on a craftsperson initiated basis. The base station collects this information for each antenna sector and for each possible handoff candidate on a per call basis. There are typically 512 possible handoff candidates, corresponding to pilot channels, and the automated neighbor list update system maintains data structures that identify the status of each pilot channel in terms of its membership in one of the above noted sets. Every time the mobile subscriber unit transmits a Pilot Strength Measurement message to the base station for an established cellular call connection, the present automated neighbor list update system parses the received information and updates the appropriate entries in the data structure maintained in the base station for this sector. The mobile subscriber unit identifies viable pilot channels and information maintained in the base station identifies the handoff candidates (neighboring base stations and base station sectors) that are associated with the identified candidate pilot channels. The Pilot Strength Measurement message can contain information regarding a plurality of viable candidate pilot channels that are available for use by the mobile subscriber unit.

Each entry in the data structure stores data that is used to qualify the viability of the corresponding pilot channel as a handoff candidate. In the present embodiment, the data selected for this purpose comprises data indicative of the number of occurrences $N_i$ that a pilot channel is identified by a mobile subscriber unit as a viable handoff candidate and the sum of the power levels $\Sigma P_i$ associated with these occurrences for all calls that are served by the base station sector. At the end of a predetermined data collection interval, a metric $M_i$ is calculated for each of these data structure entries. The metric $M_i$ is calculated by:

$$M_i = \Sigma P_i + \alpha_i N_i$$

where $\alpha_i$ is a weighting factor that is adjusted to optimize results by adjusting the importance of a number of occurrences that are relative to the measured signal strength of the pilot channel.

Neighbor List Update Process

FIG. 1 illustrates in flow diagram form the operational steps taken by the automated neighbor list update system to perform the neighbor list update process. At step 101, the automated neighbor list update system initializes the neighbor list determination process by setting the number of occurrences $N_i$ and the sum of the power levels $\Sigma P_i$ associated with these occurrences to zero for all pilot channels I=1 to I=512. At step 102, the automated neighbor list update system determines whether a Pilot Strength Measurement message has been received from a mobile subscriber unit that is operational in the call coverage area of the base station. If not, processing is halted until such a message is received. Once the Pilot Strength Measurement message is received, the automated neighbor list update system at step 103 determines which base station, closest to the mobile subscriber unit, has received the message in the instance where multiple base stations are serving a particular cellular communication connection, such as in CDMA soft handoffs. The next step of the processing is step 104 where the variable I, representing the identity of the presently updated pilot channel, is initialized to 1.

At step 105, the automated neighbor list update system determines whether the received Pilot Strength Measurement message contains signal strength data for the I Th pilot channel. If so, processing advances to step 106 where the automated neighbor list update system updates the accumulated data maintained in the data structure according to the following computations:

$$N_i = N_i + 1$$

$$\Sigma P_i = \Sigma P_i + PSM_i$$

(where $PSM_i$ is the pilot strength measurement for pilot channel I, for which data is contained in the Pilot Strength Measurement message)

$$M_i = \Sigma P_i + \alpha_i N_i$$

Alternatively, $M_i$ may be calculated after all of the data is collected and the final values of $\Sigma P_i$, and $N_i$, have been determined.

Processing then advances to step 107, as it would if the Pilot Strength Measurement message did not contain data relating to the I Th pilot channel. At step 107, the pilot channel count is incremented I=I+1. At step 108, a determination is made of whether all values of I (all pilot channels) have been reviewed. This determination takes the form of checking whether the incremented value of I exceeds the count of all pilot channels, and this decision comprises the determination of whether I=513, which would indicate that the entire range of I values have been processed. If there remain pilot channels whose data structures have not been updated, processing returns to step 105 and the above-noted steps 105–108 are repeated until the data structures for all pilot channels have been updated. If no additional pilot channel data structures have to be updated, processing advances to step 109 where the computed values of the metric $M_i$, are rank ordered as described below. Once this rank ordering computation is done, processing advances to step 110 where it is determined whether the automated neighbor list update system shall continue. This determination may be based upon a predetermined time interval for which data is collected. Alternatively, the process may continue until instructed by the mobile switching center. If the process is to continue, processing returns to step 102, otherwise the process exits.

Once the rank ordering in step 109 is completed, the Neighbor List can be updated as in step 111. Alternatively, the rank ordering can be sent to the mobile switching center for further action. In step 111, a current member of the Neighbor List may be expunged if the calculated metric of the corresponding pilot is less than the calculated metric of a different pilot and if the maximum number of members of the Neighbor List is exceeded.

Neighbor List Rank Ordering

Figure 2:
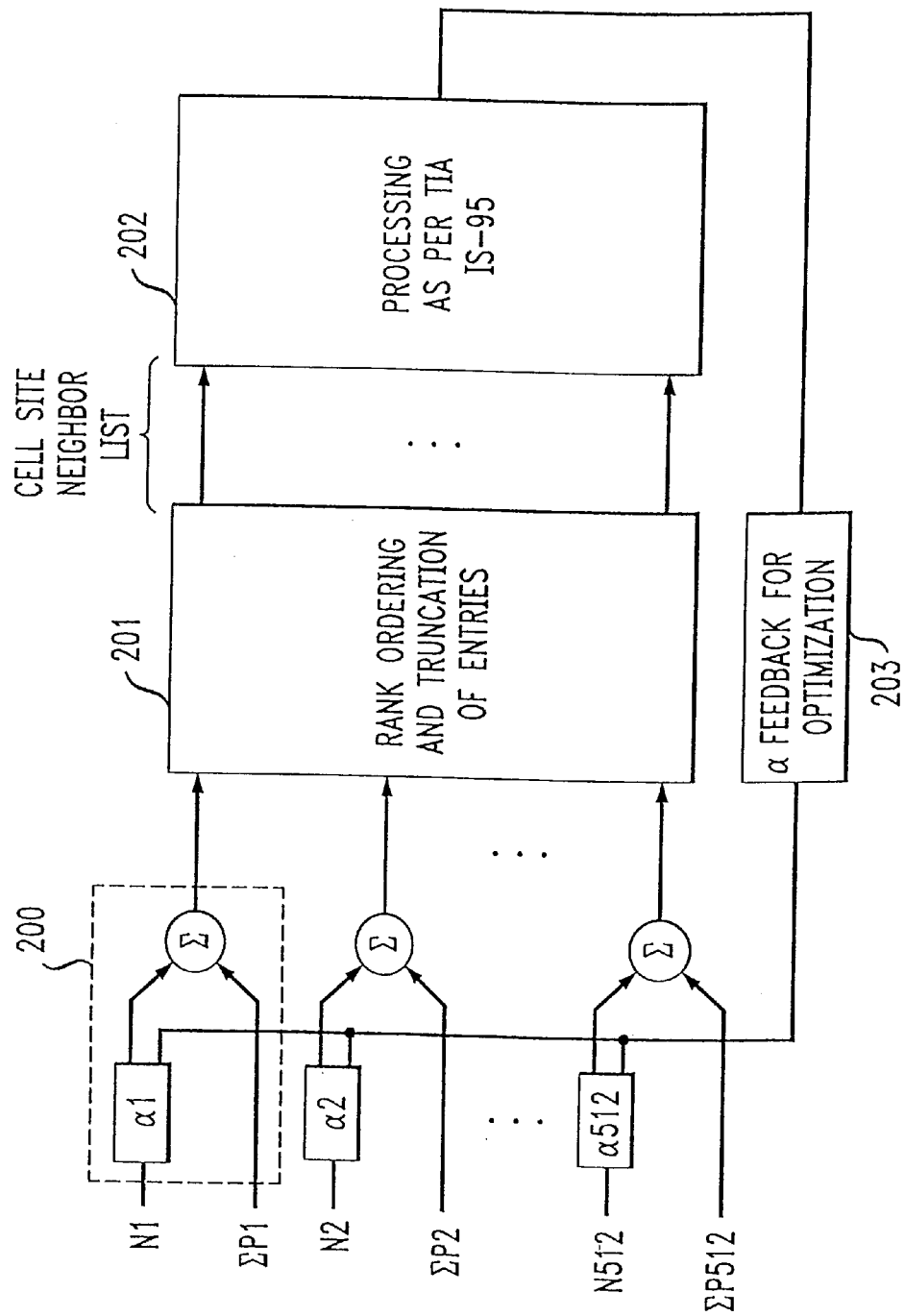
FIG. 2 illustrates in block diagram form the processing of signal strength data in the present system for automated determination of handoff neighbor lists for cellular communication systems.

FIG. 2 illustrates in block diagram form the processing of signal strength data in the automated neighbor list update system to use the data structures that are maintained for all of the pilot channels to create the rank ordered Neighbor list. In particular, present data for each of the pilot channels I are input at the appropriate terminal shown on the left side of the Figure. In process 200, the computed number of occurrences $N_i$ and the sum of the power levels $\Sigma P_i$ associated with these occurrences are input for each pilot channel and then processed by the number of occurrences $N_i$ being multiplied by the weighting factor a and the result summed with the sum of the power levels $\Sigma P_i$ associated with these occurrences to produce the metric $M_i$ for this pilot channel. The resultant metrics for all pilot channels are input to the rank ordering process 201 to order the metrics according to a predetermined ordering, such as magnitude. The resultant list is truncated to form a Neighbor List that contains a predetermined number of entries. The automated neighbor list update system then outputs its generated Neighbor List to the base station call processing system 202 for processing handoffs in the management of cellular call connections as is well known.

In addition to the maintenance of the Neighbor list as described, the performance of the automated neighbor list update system can be automatically determined and the weighting factor $\alpha_i$ updated by the collection of call failure data. In particular, the weighting factor $\alpha_i$ can be selected to minimize the number of cellular call connections that are dropped by the failure of the cellular communication system to properly handoff the call connection to a member of the Neighbor List. In this regard, the weighting factor $\alpha_i$ can be determined either by experimentation or by a search algorithm 203. One example of a search algorithm is an iterative gradient search procedure where $\alpha_{i(new)} = \alpha_i - \mu \nabla_1$, where the variable $\nabla_1$ represents the gradient of the error with respect to the present weighting factor $\alpha_i$ for pilot channel I and $\mu$ is a constant that ensures stability and a desirable rate of convergence for the system operation. The gradient of error can be selected to be some measurable metric of operation of the cellular communication, such as the percentage of cellular call connections that are dropped for this pilot channel during handoff operations or call setup attempts that fail or a combination of the previous two events. Therefore, the automated neighbor list update system can adapt its computation process for each of the pilot channels as a function of real time performance to improve the performance of the cellular communication system.

Soft Handoffs

Existing CDMA cellular communication systems support soft handoffs that require multiple base stations or base station sectors to support a given cellular call connection simultaneously at a given time. The soft handoff system complicates the operation of the automated neighbor list update system in that the system must determine which base station/sector should have its Neighbor list updated by the received Pilot Strength Measurement message data. The selection of the appropriate base station/sector can be effected by the use of the round-trip delay that is measured at each serving base station/sector and/or the identity of the pilot channel that has the earliest arriving multipath signals received by the mobile subscriber unit. This data is presently available in the CDMA cellular communication system and can therefore be used in this determination. The measured round-trip delay identifies the time required for a signal to travel from the base station to the mobile subscriber unit and thence back to the base station, thereby identifying the base station/sector that is closest to the mobile subscriber unit.

Set Maintenance

Figure 3:
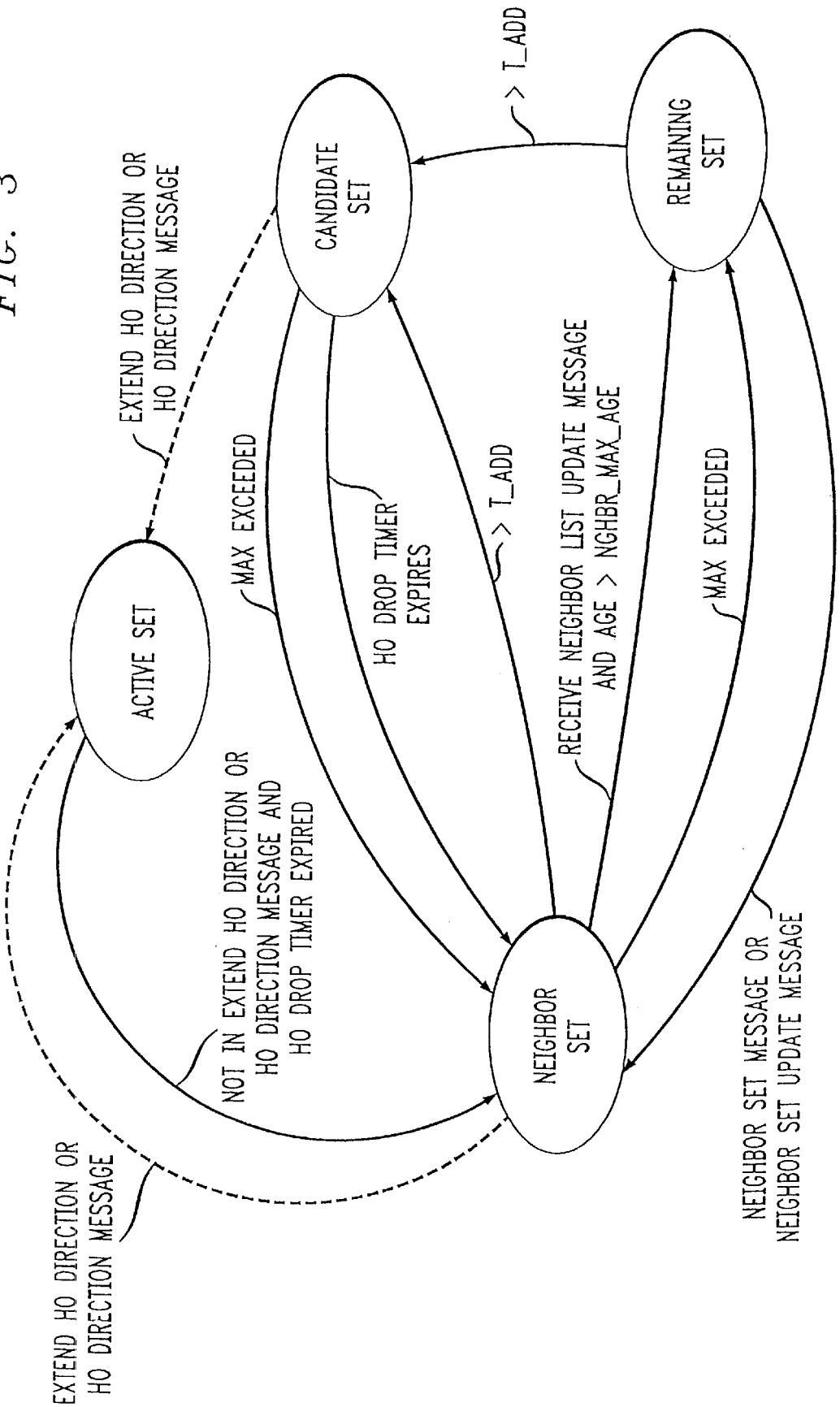
FIG. 3 illustrates in state diagram form the various sets maintained for the pilot channels and the modes of reassigning pilot channels among the various sets.

FIG. 3 illustrates in state diagram form the process that is implemented in the automated neighbor list update system to maintain the various sets of pilot channels and the modes of reassigning pilot channels among the various sets. For example, when the mobile subscriber unit is first assigned a Forward Traffic Channel, the mobile subscriber unit initializes the Active Set to contain only the pilot channel associated with the assigned Forward Traffic Channel. Whenever the mobile subscriber unit receives a Handoff Direction Message or an Extended Handoff Direction Message that identifies a selected pilot cannel that is used for a handoff, it moves the selected pilot channel from either the Neighbor Set or the Candidate Set where it is presently listed to the Active Set. A pilot channel can be moved from the Active Set to the Neighbor Set whenever the base station transmits a Handoff Direction Message or an Extended Handoff Direction Message to the mobile subscriber unit and the handoff drop timer expires.

The Candidate Set initially is empty and is maintained by the transfer of pilot channels from the Neighbor Set and Remaining Set into the Candidate Set and from the Candidate Set into the Neighbor Set and the Active Set. This is accomplished by the processing of any of a number of measured conditions or messages from the base station. For example, when the mobile subscriber unit detects that the strength of a pilot channel that is listed in the Neighbor Set or the Remaining Set exceeds a predetermined threshold T_ADD, it moves the identified pilot channel from the Neighbor Set or the Remaining Set into the Candidate Set. If the mobile subscriber unit determines that the handoff drop timer expires on an identified pilot channel that is listed in the Candidate Set, the mobile subscriber unit demotes the identified pilot channel to the Neighbor Set. When the mobile subscriber unit adds a pilot channel to the Candidate Set and the number of members of the Candidate Set exceeds a predetermined number, the mobile subscriber unit identifies the pilot channel in the Candidate Set whose handoff drop timer is closest to expiring and demotes that pilot channel to the Neighbor Set.

The Neighbor Set is initially populated with all of the pilot channels that were specified in the last Neighbor List Message that was received from the base station. The mobile subscriber unit maintains a counter ($AGE_i$) for each pilot channel that is contained in the Neighbor Set, with the counter being set to zero for all pilot channels that are moved into the Neighbor Set from the Active Set or the Candidate Set. The mobile subscriber unit also sets this counter to a predetermined value NGHBR_MAX_AGE when it move a pilot channel from the Remaining Set to the Neighbor Set. In operation, the values maintained in each counter $AGE_i$ is incremented every time a Neighbor List Update Message is received from the base station. Whenever the value of one of the counters exceeds a predetermined value, the associated pilot channel is moved to the Remaining Set. Similarly, when the number of members of the Neighbor Set exceeds a predetermined number, the mobile subscriber unit identifies the pilot channel in the Neighbor Set whose counter $AGE_i$ has the largest value and demotes that pilot channel to the Remaining Set. Additionally, if the mobile subscriber unit receives a Neighbor List or Neighbor List Update Message from the base station that identifies a pilot channel that is contained in the Remaining Set, the mobile subscriber unit migrates the identified pilot channel from the Remaining Set to the Neighbor Set.

The messages and drop timers that are noted above represent standard elements that are presently used by the existing cellular communication systems.

Summary

Thus, the mobile subscriber unit produced Pilot Strength Measurement (PSM) data, indicative of the relative signal strength measured at the mobile subscriber unit from a plurality of base station transmitters, along with a list of viable base station transmitter candidates as determined by the mobile subscriber unit, is used by the base station serving the existing call. The base station maintains a data structure that stores data indicative of the number of instances that a base station is recommended, the sum of power levels that were measured by the various mobile subscriber units for these instances. This data is processed to determine a metric for each data structure in the list, with the metric in the present embodiment being a function of the number of occurrences multiplied by a weighting factor summed with the sum of power levels.

What is claimed:

1. In a cellular communication system, apparatus for updating a neighbor list that contains data indicative of a predetermined number of communication channels that can be used to handoff an existing cellular communication connection for a mobile subscriber unit, comprising:

means, responsive to pilot signal strength data received from mobile subscriber units for at least one of a plurality of pilot channels, for automatically updating at least one metric associated with said at least one of a plurality of pilot channels, comprising:

means, responsive to a mobile subscriber unit identifying a one of said plurality of pilot channels having a signal strength that exceeds a predetermined threshold, for generating data indicative of a number of instances that said one of said plurality of pilot channels has a signal strength that exceeds a predetermined threshold, means, responsive to a mobile subscriber unit identifying a one of said plurality of pilot channels having a signal strength that exceeds a predetermined threshold, for generating data indicative of power level of said number of instances that said one of said plurality of pilot channels has a signal strength that exceeds a predetermined threshold, means for generating a pilot channel metric for said one of said plurality of pilot channels using said data indicative of a number of instances and said data indicative of power level of said number of instances;

means for rank ordering said plurality of pilot channels as a function of said metrics; and means for selecting at least one of said plurality of pilot channels for said neighbor list.

2. The cellular communication system of claim 1 wherein said means for rank ordering comprises:

means for ordering said plurality of pilot channels in order of a magnitude of said metrics.

3. The cellular communication system of claim 1 wherein said means for selecting comprises:

means for identifying a predetermined number of communication channels from said rank ordered list as candidates for said neighbor list; and means for adding ones of said identified predetermined number of communication channels not presently in said neighbor list to said neighbor list.

4. The cellular communication system of claim 3 wherein said means for selecting further comprises:

means, responsive to a sum of existing members of said neighbor list and said added ones of said identified predetermined number of communication channels not presently in said neighbor list to said neighbor list, exceeding said predetermined number, for expunging sufficient ones of said members of said existing neighbor list to maintain said predetermined number as a number of members of said neighbor list.

5. In a cellular communication system, a method for updating a neighbor list that contains data indicative of a predetermined number of communication channels that can be used to handoff an existing cellular communication connection for a mobile subscriber unit, comprising the steps of:

automatically updating, in response to pilot signal strength data received from mobile subscriber units for at least one of a plurality of pilot channels, at least one metric associated with said at least one of a plurality of pilot channels, comprising:

generating, in response to a mobile subscriber unit identifying a one of said plurality of pilot channels having a signal strength that exceeds a predetermined threshold, data indicative of a number of instances that said one of said plurality of pilot channels has a signal strength that exceeds a predetermined threshold, generating, in response to a mobile subscriber unit identifying a one of said plurality of pilot channels having a signal strength that exceeds a predetermined threshold, data indicative of power level of said number of instances that said one of said plurality of pilot channels has a signal strength that exceeds a predetermined threshold, generating a pilot channel metric for said one of said plurality of pilot channels using said data indicative of a number of instances and said data indicative of power level of said number of instances;

rank ordering said plurality of pilot channels as a function of said metrics; and selecting at least one of said plurality of pilot channels for said neighbor list.

6. The method of operating a cellular communication system of claim 5 wherein said step of rank ordering comprises:

ordering said plurality of pilot channels in order of a magnitude of said metrics.

7. The method of operating a cellular communication system of claim 5 wherein said step of selecting comprises:

identifying a predetermined number of communication channels from said rank ordered list as candidates for said neighbor list; and adding ones of said identified predetermined number of communication channels not presently in said neighbor list to said neighbor list.

8. The method of operating a cellular communication system of claim 7 wherein said step of selecting further comprises:

expunging, in response to a sum of existing members of said neighbor list and said added ones of said identified predetermined number of communication channels not presently in said neighbor list to said neighbor list, exceeding said predetermined number, sufficient ones of said members of said existing neighbor list to maintain said predetermined number as a number of members of said neighbor list.

9. In a cellular communication system, apparatus for updating a neighbor list that contains data indicative of a predetermined number of communication channels that can be used to handoff an existing cellular communication connection for a mobile subscriber unit, comprising:

means, responsive to pilot signal strength data received from mobile subscriber units for a plurality of pilot channels indicative of signal, for generating data indicative of a number of instances that each of said plurality of pilot channels has a signal strength that exceeds a predetermined threshold;

means for generating data indicative of power level of said plurality of pilot channels that has a signal strength that exceeds a predetermined threshold;

means for automatically updating at least one metric associated with said plurality of pilot channels using said data indicative of a number of instances and said data indicative of power level;

means for rank ordering said plurality of pilot channels as a function of said metrics; and means for selecting at least one of said plurality of pilot channels for said neighbor list.

10. The cellular communication system of claim 9 wherein said means for rank ordering comprises:
   means for ordering said plurality of pilot channels in order of a magnitude of said metrics.

11. The cellular communication system of claim 9 wherein said means for selecting comprises:
   means for identifying a predetermined number of communication channels from said rank ordered list as candidates for said neighbor list; and
   means for adding ones of said identified predetermined number of communication channels not presently in said neighbor list to said neighbor list.

12. The cellular communication system of claim 11 wherein said means for selecting further comprises:
   means, responsive to a sum of existing members of said neighbor list and said added ones of said identified predetermined number of communication channels not presently in said neighbor list to said neighbor list, exceeding said predetermined number, for expunging sufficient ones of said members of said existing neighbor list to maintain said predetermined number as a number of members of said neighbor list.

13. In a cellular communication system, a method for updating a neighbor list that contains data indicative of a predetermined number of communication channels that can be used to handoff an existing cellular communication connection for a mobile subscriber unit, comprising the steps of:
   generating, in response to pilot signal strength data received from mobile subscriber units for a plurality of pilot channels indicative of signal, data indicative of a number of instances that each of said plurality of pilot channels has a signal strength that exceeds a predetermined threshold;
   generating data indicative of power level of said plurality of pilot channels that has a signal strength that exceeds a predetermined threshold;
   automatically updating at least one metric associated with said plurality of pilot channels using said data indicative of a number of instances and said data indicative of power level;
   ordering said plurality of pilot channels as a function of said metrics; and
   selecting at least one of said plurality of pilot channels for said neighbor list.

14. The method of operating a cellular communication system of claim 13 wherein said ste of rank ordering comprises:
   ordering said plurality of pilot channels in order of a magnitude of said metrics.

15. The method of operating a cellular communication system of claim 13 wherein said step of selecting comprises:
   identifying a predetermined number of communication channels from said rank ordered list as candidates for said neighbor list; and
   adding ones of said identified predetermined number of communication channels not presently in said neighbor list to said neighbor list.

16. The method of operating a cellular communication system of claim 15 wherein said step of selecting further comprises:
   expunging, in response to a sum of existing members of said neighbor list and said added ones of said identified predetermined number of communication channels not presently in said neighbor list to said neighbor list, exceeding said predetermined number, sufficient ones of said members of said existing neighbor list to maintain said predetermined number as a number of members of said neighbor list.

* * * * *